Dec. 10, 1940.    R. GOLDSCHMID ET AL    2,224,784
EYEGLASS
Filed Jan. 19, 1939
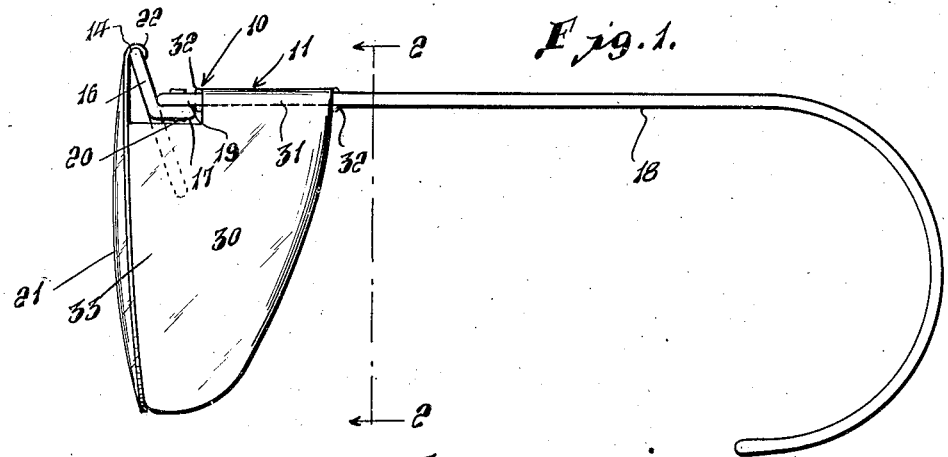
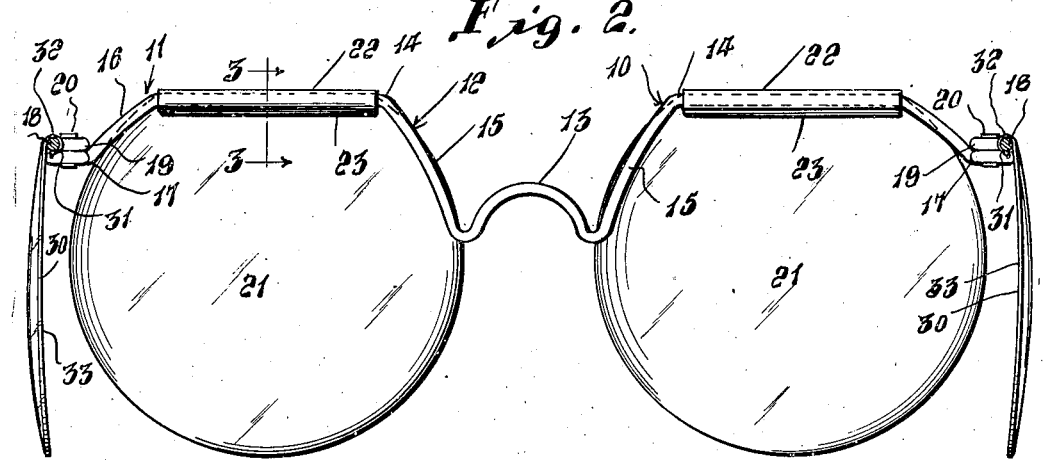
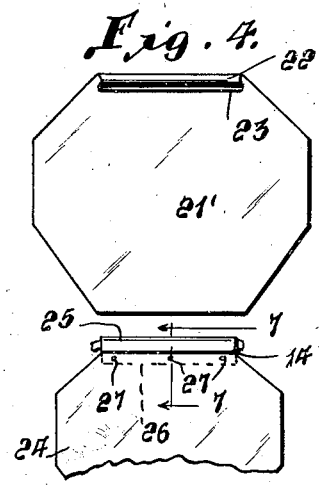
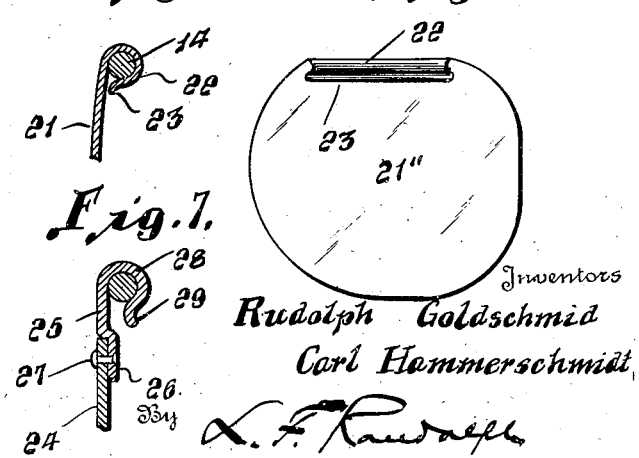
Inventors
Rudolph Goldschmid
Carl Hammerschmidt
By L. F. Randolph
Attorney Patented Dec. 10, 1940

2,224,784

UNITED STATES PATENT OFFICE 2,224,784

EYEGLASS

Rudolph Goldschmid and Carl Hammerschmidt, Milwaukee, Wis.

Application January 19, 1939, Serial No. 251,786

1 Claim. (Cl. 2—13)

This invention relates to an improved construction for eyeglasses provided with means whereby the lenses may be readily detached from their supporting frame and means for angularly adjusting the lenses relatively to the frame.

It is a primary object of this invention to provide an improved construction of eyeglasses particularly adapted for use as sun glasses and other forms of glare shields having means whereby the lenses may be adjusted according to the angle and direction of the rays from which the eyes are to be shielded, said lenses likewise being movable to a horizontal position above the eyes when not needed or when used as an eye shade.

Still another aim of the invention is to provide eyeglasses having adjustable side shields to protect the eyes from light rays from either side, said side shields being likewise pivotally mounted and readily detachable.

A particular advantage of the invention resides in the fact that the lens frame is adapted to support lenses of various shapes by providing means whereby the lenses are readily detachable, a plurality of different sizes and shapes of lenses may be employed with a single frame, and in addition lenses of different colors may be employed depending upon the intensity of the light rays from which the eyes are to be shielded.

Other objects and advantages of the invention will hereinafter become more fully apparent from the following description of the drawing, which illustrates a preferred embodiment thereof, and wherein:

Figure 1 is a side elevational view of the invention,

Figure 2 is a sectional view taken along the line 2—2 of Figure 1,

Figure 3 is a sectional view taken along the line 3—3 of Figure 2,

Figures 4 and 5 are side elevational views of modified shapes from those shown in Figures 1 and 2, Figure 6 is a fragmentary side elevational view of another modified form of lens provided with a separate hanger, and Figure 7 is a sectional view taken along the line 7—7 of Figure 6.

Referring more particularly to the drawing, wherein like reference characters designate like or corresponding parts throughout the different views, 10 designates generally a pair of eyeglasses constructed in accordance with the invention and comprising the lens supporting frame designated generally 11, which includes the front lense supporting member 12 which is preferably formed from a single strand of wire bent intermediate of its ends to provide the arch shaped nose bridge 13. Member 12 also includes the spaced horizontal portions 14 which are connected at their adjacent ends to the ends of the nose bridge 13 by the downwardly curved corresponding legs 15 by means of which the horizontal portions 14 are disposed above and spaced from the ends of the nose bridge 13. The strand forming the member 12 terminates in the corresponding downwardly curved free ends 16 which depend from the remote ends of the horizontal portions 14, and which are provided with the terminal loops 17. As best seen in Figure 2, the portions 14, 15, 16 and 17 on each side of the nose bridge 13 correspond in shape, size and relative position to the bridge 13.

The eyeglass frame 11 also includes the corresponding ear bows or temples 18 each having a looped end 19 adapted to be disposed above a loop 17, as best seen in Figure 2, and to be pivoted thereto by means of a pin 20 extending through the superposed loops. The front frame portion 12 is adapted to mount a pair of lenses 21 which may be formed of any suitable transparent material which is preferably unbreakable such as Celluloid and which may be clear or of any desired color. Lenses 21 are provided with the integrally formed hook shaped hangers which are substantially the same length as the portions 14 which they are adapted to detachably engage. Hangers 22 have the free ends 23 which may be sprung outwardly to attach or detach the lenses 21 from the portions 14 and are adapted to possess sufficient resilience so that when in engagement with the portions 14 they will maintain sufficient frictional contact therewith to retain the lenses in any adjusted position. Lenses are shown as being circular but it is to be understood that the eyeglass frame 11 is adapted to support lenses of various shapes as for example the octagon shaped lens 21', as seen in Figure 4 or the oval shaped lens 21'', as seen in Figure 5.

In Figures 6 and 7, another modified form of the invention is shown wherein the lens designated 24 is shown provided with a detachable hanger 25. The hanger 25 may be employed instead of the integrally formed hanger 22 where a lens 24 is formed of glass or an unbreakable material which cannot be bent or which is not sufficiently resilient so that the hangers 22 could be formed integral therewith. Hanger 25 is provided with a lower offset portion 26 which is adapted to be disposed along one side of the lens 24, at its upper edge, and to be secured thereto by means of a plurality of spaced fastenings 27, such as rivets. Hanger 25 is provided with the hook shaped portion 28 and the free edge 29 corresponding in length and shape to portions 22 and 23, respectively. The hanger 25 may be formed of any suitable material possessing sufficient resiliency to enable it to be readily attached and detached to and from the portions 14 and when in engagement therewith to maintain sufficient frictional engagement to hold the lens 24 in any adjusted position.

The eyeglasses 10 also include the side shields 30 which may be of any desired shape and which may be formed of any of the materials from which lenses 21, 21', 21" or 24 are formed, and of any desired color, preferably such as to correspond with the lenses with which they are used so that side shields 30 in effect constitute antiglare side lenses. Shields 30 are provided with the integrally formed upwardly projecting hook shaped portions 31, which correspond in construction to portions 22 and which are adapted to detachably engage the bows 18 adjacent their looped ends 19 and to be held in position relatively thereto by means of the enlargements 32. Portions 31 frictionally engage the bows 18 to be thereby held in adjusted position relatively thereto. Shields 30, as best seen in Figure 1, are preferably shaped to provide the forwardly projecting portions 33 having their forward edges projecting substantially out to the lenses 21, when said lenses are in substantially a vertical position, as seen in Figure 1. If desired, the shields 30 may be provided with supporting hangers such as the hangers 25 instead of the hook shaped portions 31.

The eyeglasses 10 are adapted to be worn in the conventional manner and it will be noted that the loops 17 are disposed at an obtuse angle to portions 16 and 15 and to the bridge 13 and as these loops are held in substantially a horizontal position by the ear bows 18 it will be obvious that the portion 12 which includes the portions 14, 15 and 16, will extend upwardly and outwardly relatively to the nose and eyes of the wearer. Lenses 21 may be positioned in front of the eyes and substantially at right angles to the direct line of vision or they may be swung outwardly and upwardly to any desired angle to provide the maximum of protection from light rays or glare, and as the portions 22 frictionally engage the horizontal portions 14 the lenses will be held in any adjusted position. When the front lenses 21 are not required they may be detached as heretofore described, or they may be swung upwardly to a horizontal position substantially at right angles to the position as seen in Figure 1. In this position, the lenses 21 will not be in the line of vision and may be employed in this position for reading as an eye shade. Side shields or lenses 30 may likewise be swung upwardly and outwardly depending upon the angle of the light rays or of the glare so as to provide the maximum of protection to the eyes from the sides, or when not required they may be readily detached. Also, lenses 21 or the shields 30 may be detached and replaced by lenses or shields of other colors or of other shapes, as heretofore mentioned. Inasmuch as hook shaped portions 22 and the portions 28 are substantially the same length as the horizontal portions 14 the front lenses 21, 21', 21" or 24 will be prevented from moving longitudinally of the lens supporting portion 12, and as the hook shaped portions 31 are substantially the same length as the space between the abutments 32 of each ear bow 18 the shields 30 will likewise be held from longitudinal movement relatively to the ear bows.

Various modifications and changes in the precise construction and arrangement of the parts forming the invention are contemplated and may obviously be resorted to, and the right is therefore expressly reserved to make such variations and changes as fall within the spirit and scope of the invention as hereinafter defined by the appended claim.

We claim as our invention:

An eye shield comprising a lens frame formed of a single strand of wire having its intermediate portion shaped to form a nose bridge, corresponding bowed portions projecting upwardly and outwardly from the ends of the bridge and terminating in oppositely extending substantially horizontal portions, said horizontal portions terminating in downwardly curved free ends, the terminals of which are disposed substantially above the plane of the nose bridge, ear bows pivotally connected to said terminals and provided with spaced enlargements adjacent their pivoted ends; lenses, of Celluloid or the like, each having a hooked shaped hanger, said hangers being of substantially the same length as the horizontal portions of the frame, for pivotally and frictionally engaging said horizontal portions for adjustably mounting the lenses relatively to the frame, and transparent shields having hooked shaped portions, of substantially the same length as the space between the pairs of enlargements, for pivotally and frictionally engaging the ear bows, between their spaced enlargements, for adjustably mounting the shields relatively thereto, the relative lengths of the hangers and horizontal portions, and of the hook shaped portions and the space between said enlargements, fixing the longitudinal positions of the lenses relatively to the frame and of the shields relatively to the ear bows.

RUDOLPH GOLDSCHMID.
CARL HAMMERSCHMIDT.